UNITED STATES PATENT OFFICE.

FREDERICK C. ATKINSON, OF INDIANAPOLIS, INDIANA.

SHORTENER FOR BAKING FOODS.

1,231,114.

Specification of Letters Patent.　　Patented June 26, 1917.

No Drawing.　　Application filed June 19, 1916.　Serial No. 104,584.

*To all whom it may concern:*

Be it known that I, FREDERICK C. ATKINSON, a citizen of the United States, residing at Indianapolis, Marion county, and State of Indiana, have invented and discovered certain new and useful Improvements in Shorteners for Baking Foods, of which the following is a specification.

My invention relates to food compounds and processes of making same. Its object is to provide a compound particularly adapted for shortening cereal baking products, and of a form convenient for handling, packing and for intimate intermixture with a flour or dough and capable of being readily measured and also adapted for other uses, in which a fat or fatty oil in a dry, finely divided state may be of advantage.

The compound consists, broadly stated, of a fat or fatty oil in the form of a powder, and the process consists of hardening a fat or fatty oil by hydrogenation to such a state of hardness that it will be resistant to melting except at a high temperature, considerably above that of atmospheric temperature, and then pulverizing said hardened compound to reduce it to a dry, fine powder.

Numerous fats and fatty oils may be employed in the production of the powder, within the limits of those possessing the property of hardening to a sufficient degree to permit pulverization to the exclusion of coalescence. Thus the stearin fats and oils are suitable for this purpose. Particularly, oils rich in the unsaturated fats such as olein and linolein, are well adapted for reduction by this process.

As an example of the invention, corn oil may be employed as the compound from which the product is to be formed, and it is first reduced to a solid form of sufficient hardness to withstand a temperature beyond that of usual atmospheric temperatures, by hydrogenation, in accordance with known methods. By such step the compound may be produced in a solid state capable of resisting a temperature of approximately 148° F. This solid is then subjected to a pulverizing action in a suitable grinding mill, preferably one having cooled rolls, whereupon it will be reduced to a fine, dry powder. During the pulverization of the compound its temperature should be kept below its melting point. This powder is particularly useful as a shortening composition for cereal baking products and may be added to the flour or to the dough in definite measured quantities, in lieu of lard, butter or other solid or liquid shortening materials, and when so added may be more easily and intimately mixed with flour and dough than said other shortening products.

Such powder may be also used for other purposes for which a fat or fatty oil is advantageous.

Having thus described my invention, what I claim is:

Hydrogenated corn oil in the form of a powder.

In witness whereof, I have hereunto set my hand and seal at Indianapolis, Indiana, this 2nd day of June, A. D. nineteen hundred and sixteen.

FREDERICK C. ATKINSON. [L. S.]

Witnesses:
　　A. C. RICE,
　　H. P. DOOLITTLE.